(12) United States Patent
Wegman

(10) Patent No.: US 6,951,230 B1
(45) Date of Patent: Oct. 4, 2005

(54) CONTINUOUSLY VARIABLE LENGTH AND SHAPED AUGER FOR POWDER FILLERS

(75) Inventor: Paul M. Wegman, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/934,157

(22) Filed: Sep. 3, 2004

(51) Int. Cl.⁷ .............................................. B67C 3/26
(52) U.S. Cl. .................. 141/256; 141/94; 141/258; 141/259; 222/229; 222/548; 198/550.1
(58) Field of Search ............................ 141/18, 94, 95, 141/255–260; 222/142.9, 218, 229, 367, 222/548; 198/507, 511, 550.1, 625, 641; 414/326

(56) References Cited

U.S. PATENT DOCUMENTS 1,248,610 A * 12/1917 Caracristi .................. 414/323
2,933,175 A * 4/1960 Gray ......................... 198/579
4,185,669 A * 1/1980 Jevakohoff ................... 141/59
5,327,947 A * 7/1994 McGregor .................... 141/71
5,921,295 A   7/1999 Zelazny et al.

* cited by examiner

Primary Examiner—Timothy L. Maust
(74) Attorney, Agent, or Firm—William Henry, II

(57) ABSTRACT

An apparatus for controlling the denseness of powder conveyed from a hopper through a funnel and into a container includes an auger that is positioned within the funnel that is rotatable and vertically movable. The rotation and vertical movement of the auger serves to continuously vary the length of the auger and as a result maximizes the mass of powder that can fill the container. Alternatively, the auger can include an articulatable section that splays when it is extended beyond a terminal portion of the funnel. Still yet, the device could include a hollow auger shaft with an internal rod that has the ability to extend and retract. The rod includes a strip portion and with the strip portion retracted, the powder discharged is in its densest state. As the strip portion is extended the powder density is reduced.

22 Claims, 7 Drawing Sheets

FIG. 4A

CONTINUOUSLY VARIABLE LENGTH AND SHAPED AUGER FOR POWDER FILLERS

BACKGROUND

This disclosure relates in general to filling containers with powder, and more particularly, to fill to a very complete level, different shaped containers.

Typically, a hopper for flowable bulk materials, such as, dry powders or toner used in copiers/printers has a vertical cylindrical section joined at its lower edge to a conical or frusta-conical section. A funnel is joined at the lower edge of the conical or frusta-conical section of the hopper. The hopper is filled through an inlet opening at the top of the cylindrical section, and is emptied through an outlet at the lowermost point of the funnel into a container.

It is common when filling powders, for example, toners into toner containers, for the toner to be transported from a funnel portion of a toner supply hopper, through a funnel into the containers by a rotating auger. The auger is a spiral shaped mechanical part that pushes particles of toner through the hopper by direct mechanical contact. The nature of this mechanical contact process creates substantial limitations on accuracy and productivity of the toner filling operation. The problem presented is to dispense toner that will flow to all areas of the containers thereby packing the greatest mass of toner into the containers. Unfortunately, dispensing dense toner continuously does not sufficiently fill voids in the containers because dense toner does not flow well. Also, dense toner occasionally causes a startup condition that results in the auger "seizing" in the discharge or funnel area of the hopper and funnel. In order to restore the operation of the filler in this case, the hopper and funnel must be partially disassembled and the packed toner removed. This causes significant material and productivity loss. Continuously dispensing less dense toner prevents the required mass of toner from being added before the toner overfills the container. A resolution is to adjust process parameters to find a compromise density that will minimize "seizes" and still fill the containers to the required level. However, this single density choice does not maximize the mass of toner that can fill a container.

Problems with filling toner in small containers that fit into tight spaces are exacerbated in that toner containers for small, low cost printers and copiers are produced in higher quantities necessitating very efficient toner filling operations. In addition, toner containers for small, low cost printers and copiers typically have irregular shapes to conform to the allotted space within the printer or copier. Therefore, it becomes difficult to fill the toner container because of the small funnel required to fit into the toner container opening and secondly for all of the toner within the container to completely fill the remote portions of the container before the container overflows.

One attempt at improving the flow of powders includes U.S. Pat. No. 5,921,295 issued Jul. 13, 1999 to Joseph S. Zelazny et al. that employs a high-speed nozzle for toner filling systems. The apparatus includes a conduit that is connected to and extends downward from a hopper and is adapted to permit a flow of power therethrough with the help of an auger. A nozzle is connected to the conduit and receives powder from the conduit and passes it into a container. The dimensions of the nozzle are selected so as to provide a ratio of the inlet cross sectional area to the outlet cross sectional area such that the flow of powder does not seize as it progresses through the nozzle.

Obviously, there is still a need for an apparatus that will dispense toner from a nozzle that will flow to all areas of a container thereby packing the greatest mass of toner into the container.

Accordingly, an improved method and apparatus is disclosed for filling containers of different shapes with powder that includes an apparatus for controlling the denseness of powder conveyed from a hopper through a funnel and into a container and includes an auger that is positioned within the hopper and funnel and adapted to rotate and move vertically. The rotation and vertical movement of the auger serves to continuously vary the length of the auger and as a result maximizes the mass of powder that can fill the container. Alternatively, the auger can include an articulatable section that splays when it is extended beyond a terminal portion of the funnel to thereby control the denseness of powder during a filling operation. As another alternative, the apparatus could include a hollow auger shaft with a rod positioned therein that is adapted to extend and retract with respect to the funnel. The rod includes a strip portion and with the strip portion retracted within the funnel, the powder discharged is in the densest state. As the strip portion is extended beyond an end portion of the funnel the powder density is reduced.

BRIEF DESCRIPTION OF THE DRAWINGS

The foregoing and other features of the disclosure will be apparent and easily understood from a further reading of the specification, claims and by reference to the accompanying drawings in which like reference numerals refer to like elements and wherein:

Figure 1:
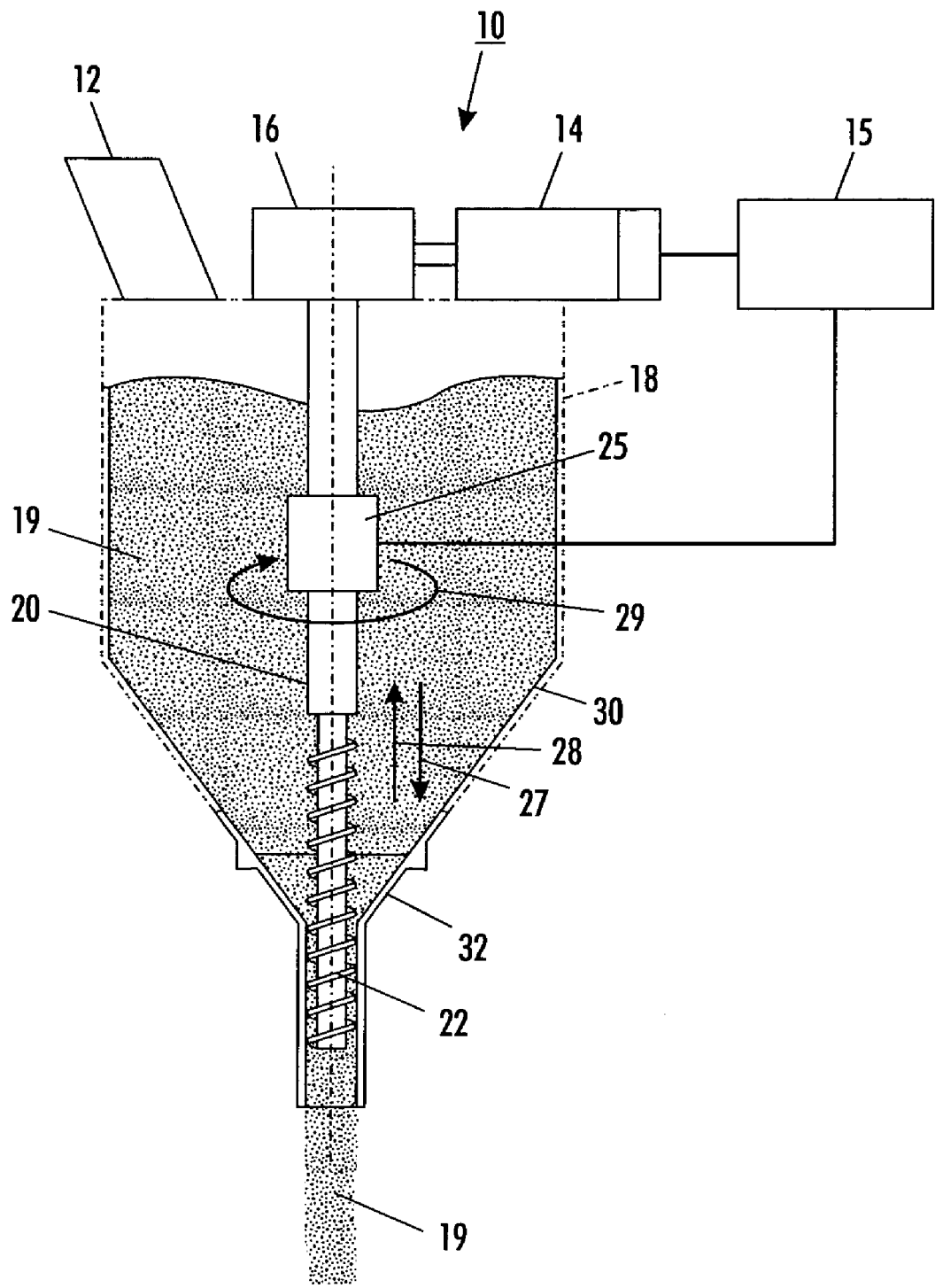
FIG. 1 is a schematic elevation view of a typical filler hopper having a funnel-shape discharge and funnel connected thereto with a vertically movable filler auger located within the hopper and funnel in a retracted position.

While the disclosure will be described hereinafter in connection with a preferred embodiment thereof, it will be understood that limiting the disclosure to that embodiment is not intended. On the contrary, it is intended to cover all alternatives, modifications and equivalents as may be included within the spirit and scope of the invention as defined by the appended claims.

DETAILED DESCRIPTION

The disclosure will now be described by reference to a preferred embodiment of a toner dispensing apparatus that includes an auger that is continuously variable in length and shape. However, it should be understood that the disclosed dispensing apparatus could be used in any environment in which flow of powder material is a problem.

For a general understanding of the features of the disclosure, reference is made to the drawings. In the drawings, like reference numerals have been used throughout to identify identical elements.

FIG. 1 schematically illustrates a bulk material dispensing apparatus or filler hopper 10. The bulk material 19 is a dry powder material, for example, toner used in copier/printers. The hopper 10 has an upper hollow section or shell 18 and a lower hollow funnel-shape section 30. The upper section 18 and the lower section 30 are made of suitable material, such as stainless steel or plastic. The upper section 18 is formed with an opening at inlet 12 through which the bulk material is deposited for dispensing into a container (not shown) that is positioned beneath funnel 32 that is connected to the hopper funnel-like section 30. A conveyor 22 is positioned at least partially within funnel 32 for assisting in the flow of the powder 19 through funnel 32. The conveyor 22 is preferably in the form of a spiral conveyor or auger. Auger 22 includes a drive shaft 20 that is connected for rotation by motor 14 through reducer 16 and vertical movement through coupling 25 when actuated by computer 15. Vertical movement of the auger in the filling process adds increased latitude and robustness to the toner filling process because the denseness of the toner can be controlled and auger "seize" occurrences are eliminated. Coupling 25 rotates in the direction of arrow 29 and may be a conventional mechanical (rack and pinion), electrical or hydraulic device that is used to provide the required auger movement in the direction of arrows 27 and 28. Control of coupling 25 by computer 15 allows the movement of auger 22 to be ON or OFF at anytime before or during the filling cycle. Optimization of movement of auger 22 for different toners and containers is afforded by conventional fuzzy logic in computer 15. Toner leaving funnel 32 in FIG. 1 is in its densest state since auger 22 is retracted within funnel 32.

Figure 2:
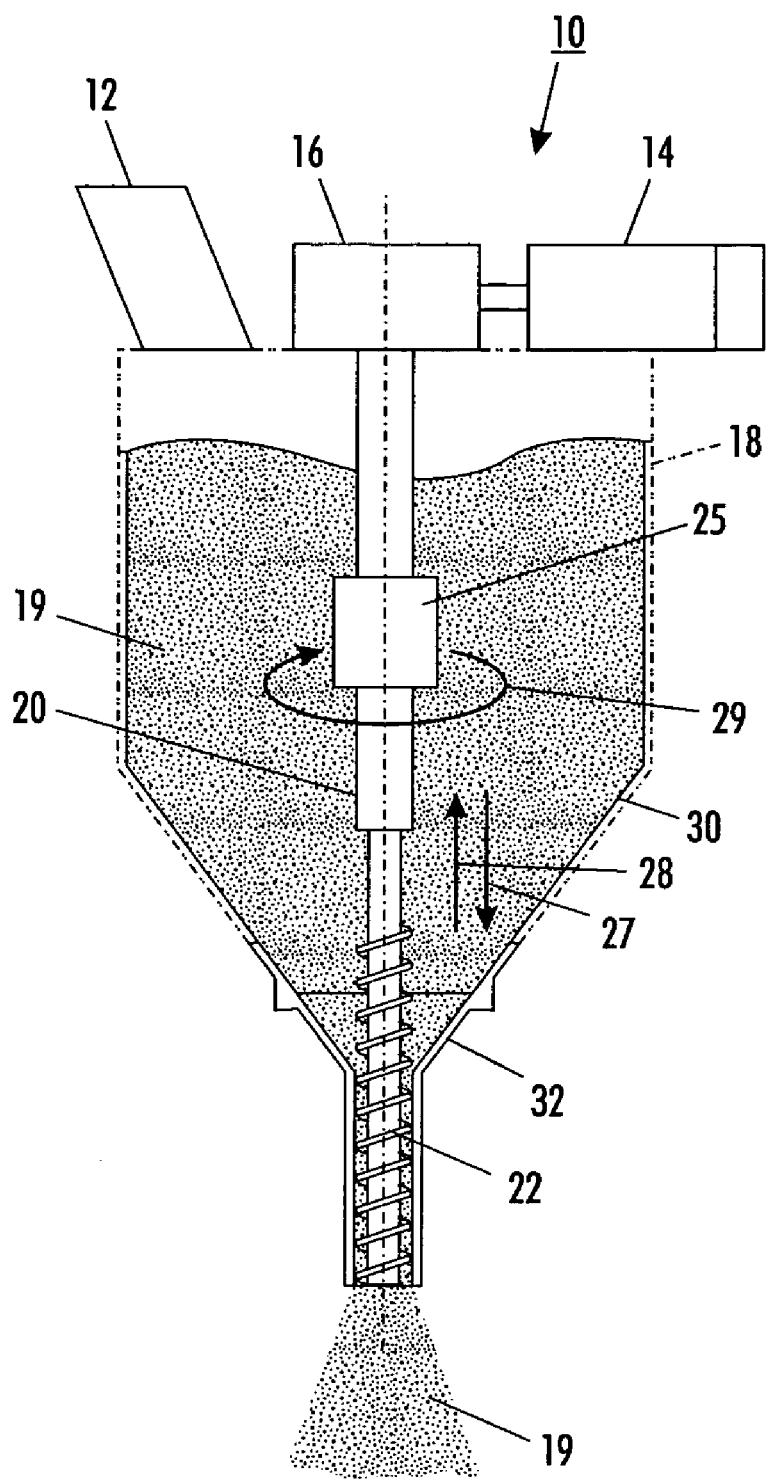
FIG. 2 is a schematic elevation view of the filler hopper of FIG. 1 showing the auger in a nominal position.
Figure 3:
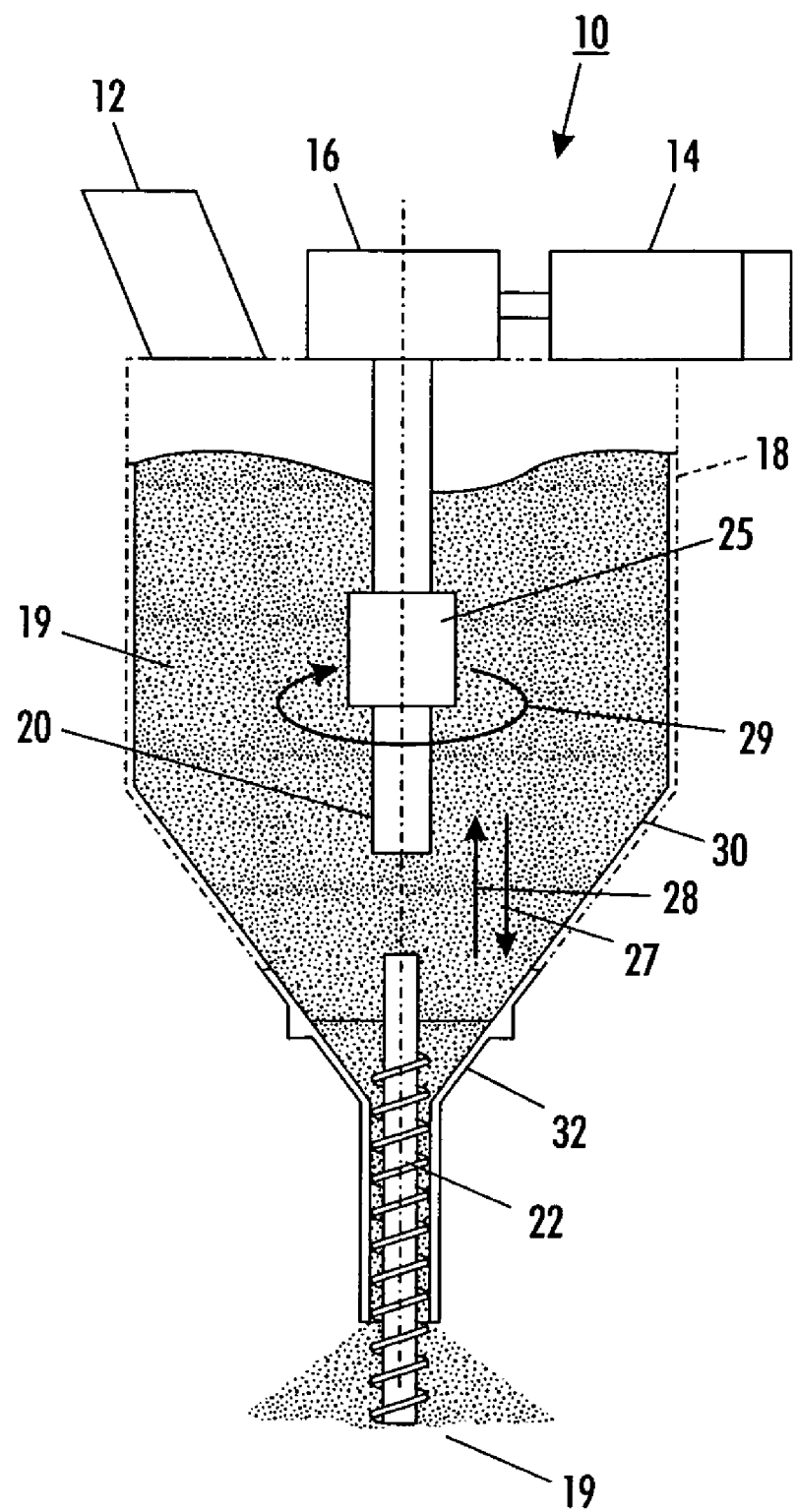
FIG. 3 is a schematic elevation view of the filler hopper of FIG. 1 showing the auger in an extended position.

As seen in FIG. 2, auger 22 has been moved by coupling 25 to a position approximating the end portion of funnel 32. This nominal position of the auger within the funnel dispenses toner 19 that is less dense than the toner dispensed in FIG. 1. Auger 22 is shown extended by coupling 25 beyond the end portion of funnel 32 in FIG. 3, and as such, toner conveyed by the auger is less dense than the toner flowing out of the funnel in FIG. 2.

Figure 4:
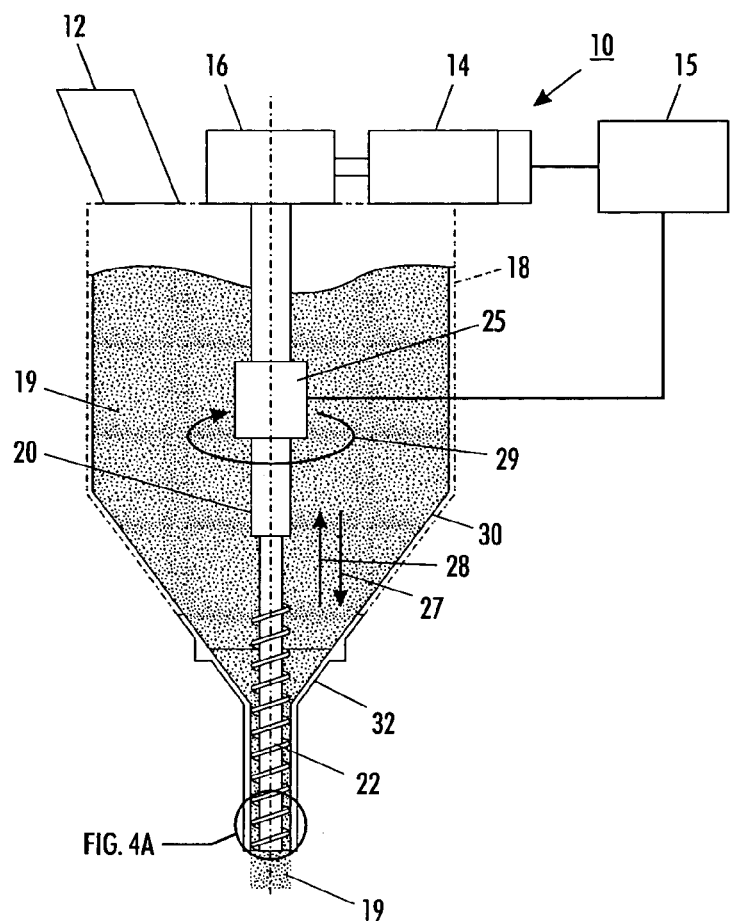
FIG. 4 is a schematic elevation view of the filler hopper of FIG. 1 showing the auger in a retracted position with an articulatable attachment connected thereto in a non-articulated position.
Figure 4A:
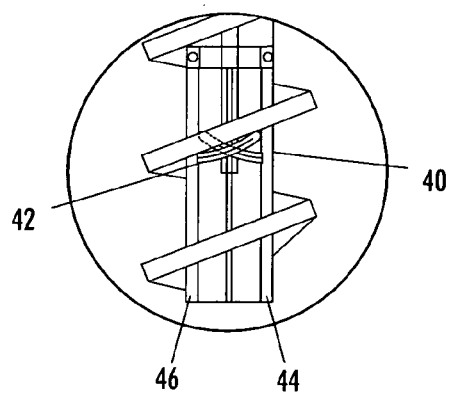
FIG. 4A is an enlarged schematic elevation view of the articulatable attachment of FIG. 4 in its non-articulated position.
Figure 5:
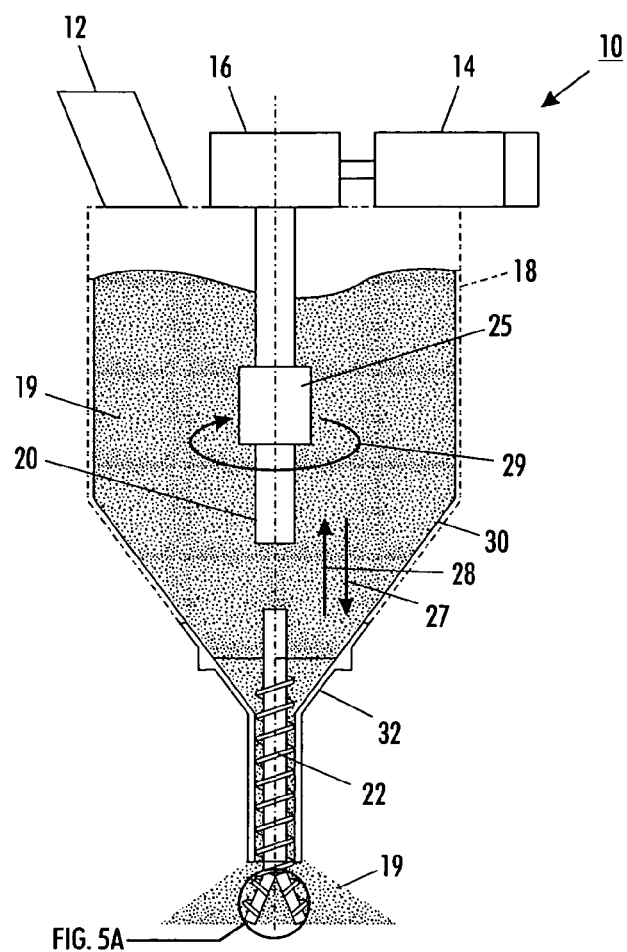
FIG. 5 is a schematic elevation view of the hopper in FIG. 4 showing the auger in an extended position with the articulatable attachment connected thereto in an articulated position.
Figure 5A:
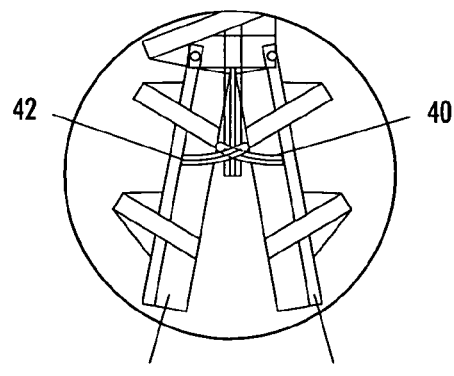
FIG. 5A is a schematic elevation view of the articulatable attachment of FIG. 5 in an articulated position.

An improvement to the embodiment of FIG. 1 is shown in FIGS. 4 and 4A and includes an attachment 40 connected to auger 22 by conventional means, such as screws, rivets, etc. Attachment 40 is articulatable and is retracted into funnel 32 in FIG. 4 to thereby permit the densest flow of toner out of the funnel. As seen in FIG. 4A, attachment 40 includes two members 44 and 46 that may be separated from each other by a conventional mechanical means, such as, a spring 42, but held together by a positive mechanical means before being retracted within the funnel. In FIGS. 5 and 5A, attachment 40 is shown extended by coupling 25 beyond the terminal portion of funnel 32 with members 46 and 47 biased apart by spring 42. With members 46 and 47 in this position, the toner exiting funnel 32 is much less dense than toner leaving the funnel in FIG. 4.

Figure 6:
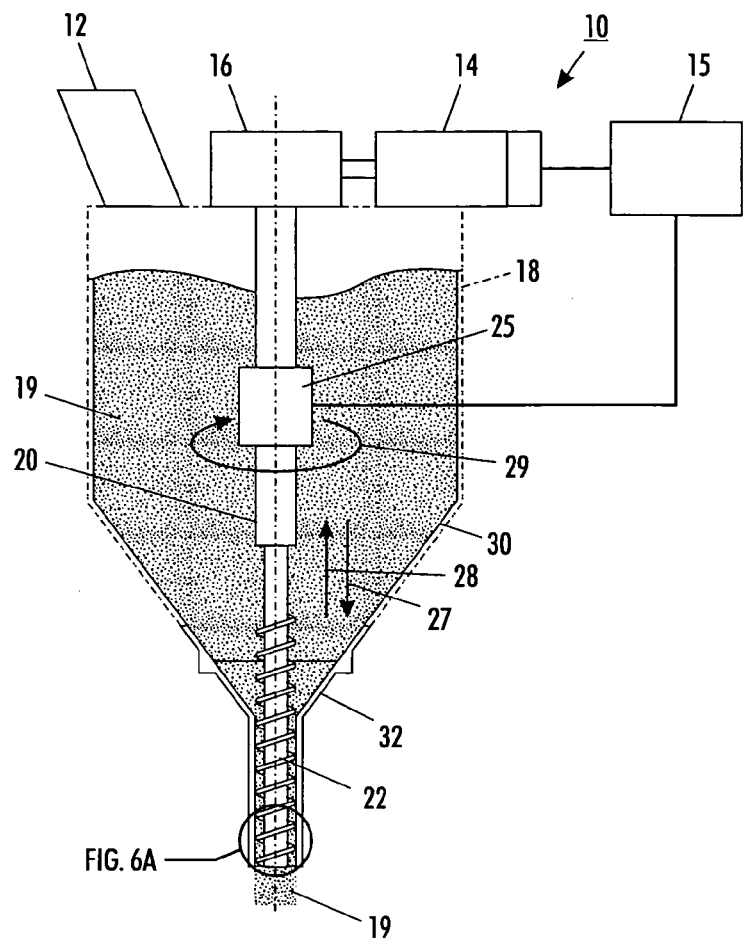
FIG. 6 is a schematic elevation view of the hopper of FIG. 1 showing an auger therein that has a hollow core and a strip inserted in the core with the strip being adapted to extend beyond the end of the auger and retract within the auger.
Figure 6A:
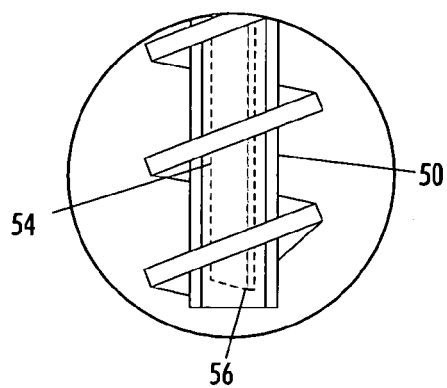
FIG. 6A is a schematic elevation view showing the auger of FIG. 6 with the strip being retracted within the auger.
Figure 7:
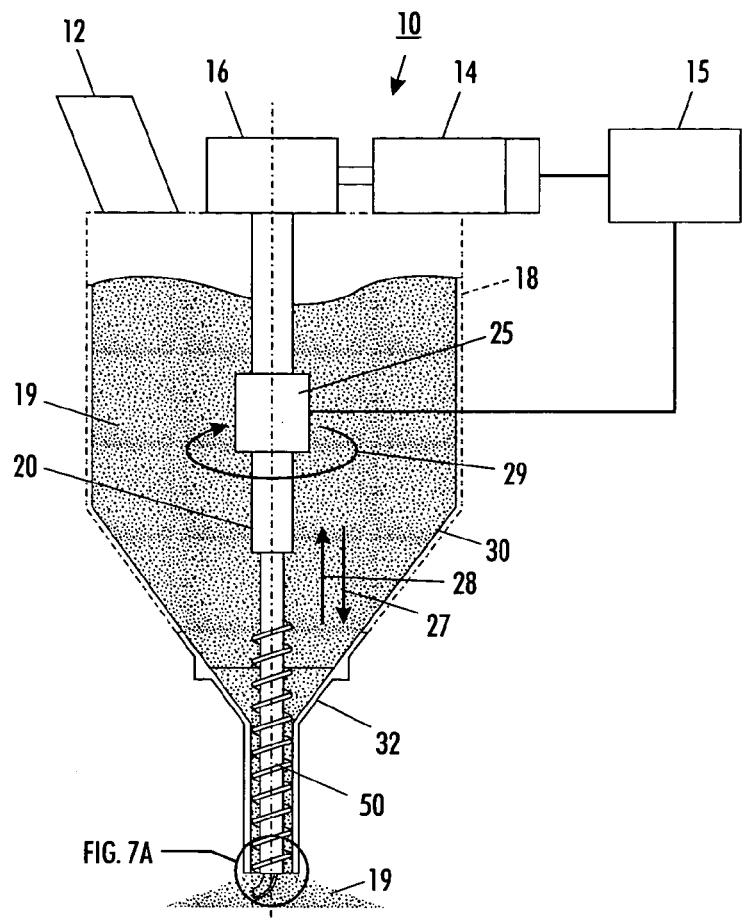
FIG. 7 is a schematic elevation view of the filler hopper of FIG. 6 showing the hollow core of the auger with the strip inserted within the core and extending beyond the end of the auger.
Figure 7A:
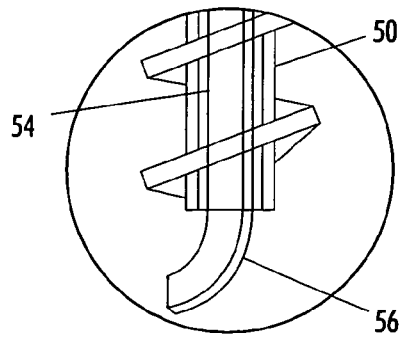
FIG. 7A is a schematic elevation view showing the auger of FIG. 7 with the strip extending beyond the end of the auger.

In the embodiments of FIGS. 6, 6A, 7 and 7A, the auger 22 of FIG. 1 has been replaced with a hollow auger shaft 50. An internal rod 54 that has the ability to extend and retract is positioned with hollow auger shaft 50. Rod 54 has a curved strip 56 at one end thereof and is connected to conventional coupling 25 and adapted to be raised and lowered within funnel 32 by the coupling upon actuation by computer 15. With strip 56 retracted as shown in FIGS. 6 and 6A, the toner 19 discharged through funnel 32 is in its densest state. As the strip is extended as disclosed in FIGS. 7 and 7A, the toner density is reduced.

It should now be understood that an improvement has been disclosed that improves the flow of powder from a hopper and funnel into a container that includes providing an auger that is adapted to move vertically within the funnel to control the denseness of toner flowing through the funnel and to prevent auger "seize" from occurring. Alternatively, the auger includes an articulated section that splays as the auger extends beyond the end of funnel in order to change the shape of the auger to provide the required disturbance to conveyed toner and thereby control denseness of the toner. In another embodiment, a hollow auger shaft with an internal rod having a strip on one end is included that has the ability to extend and retract with respect to a toner exit point of the funnel. With the strip retracted, the toner discharged is in the densest state. As the strip is extended, the denseness of the toner is lessened.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An apparatus for controlling the denseness of powder conveyed from a hopper, comprising:
    a funnel connected to said hopper;
    an auger positioned within said funnel and adapted for vertical movement to different positions with respect to an end portion of said funnel depending on the density of powder to be conveyed from said hopper, said auger including a shaft portion;
    a motor connected to said shaft portion of said auger and adapted to rotate said auger;
    a coupling device connected to said auger and adapted to move said auger vertically; and
    a programmable computer adapted to send signals to said motor and said coupling device in order to rotate and move said auger vertically to said different positions with respect to said end portion of said funnel depending on the density of powder to be conveyed from said hopper.

2. The apparatus of claim 1, wherein said auger is retracted from an end portion of said funnel in order to obtain the densest flow of powder.

3. The apparatus of claim 1, wherein said auger is positioned co-extensively with said end portion of said funnel in order to obtain a less dense flow of powder from said hopper.

4. The apparatus of claim 3, wherein said auger is extended beyond said end portion of said funnel in order to obtain an even less dense flow of powder from said hopper.

5. The apparatus of claim 1, wherein said auger includes an attachment connected thereto at an end portion thereof, and wherein said attachment includes two articulatable members.

6. The apparatus of claim 5, wherein said two articulatable members are biased apart.

7. The apparatus of claim 5, wherein said two articulatable members are moved apart by a force applied by mechanical means and returned together prior to being retracted into the funnel.

8. The apparatus of claim 7, wherein said mechanical means is a spring.

9. The apparatus of claim 1, wherein the length of said auger within said funnel is continuously variable simultaneously with powder being conveyed from said hopper.

10. An apparatus for continuously controlling the denseness of powder conveyed from a hopper, comprising:
    a funnel connected to said hopper;
    an auger positioned within said funnel, said auger including a shaft portion on one end and an articulatable section on an opposite end thereof;
    a motor connected to said shaft portion of said auger and adapted to rotate said auger;
    a coupling device connected to said auger and adapted to move said auger vertically; and
    a programmable computer adapted to send signals to said motor and said coupling device in order to rotate and move said auger vertically to thereby continuously control the density of powder conveyed by said auger out of said funnel.

11. The apparatus of claim 10, wherein said articulatable section includes two members.

12. The apparatus of claim 11, wherein said two members are biased apart.

13. The apparatus of claim 11, wherein said two members are moved apart by a force applied by mechanical means and returned together prior to being retracted into the funnel.

14. The apparatus of claim 13, wherein said mechanical means is a spring.

15. The apparatus of claim 10, wherein the shape of said auger is continuously variable.

16. An apparatus for controlling the denseness of powder conveyed from a hopper, comprising:
    a funnel connected to said hopper;
    a hollow auger positioned within said funnel, said auger including a shaft portion;
    a movable member positioned within said hollow auger;
    a motor connected to said shaft portion of said auger and adapted to rotate said auger;
    a coupling device connected to said movable member and adapted to move said movable member vertically within said hollow auger; and
    a programmable computer adapted to send signals to said motor and said coupling device in order to rotate and move said movable member vertically to thereby continuously control the density of powder conveyed by said auger out of said funnel.

17. The apparatus of claim 16, wherein said movable member is retracted from an end portion of said funnel in order to obtain the densest flow of powder therethrough.

18. The apparatus of claim 16, wherein said movable member is extended beyond said end portion of said funnel in order to vary the denseness of powder conveyed therethrough.

19. The apparatus of claim 16, wherein said movable member is a rod.

20. The apparatus of claim 19, wherein said rod includes a strip at an end thereof.

21. The apparatus of claim 20, wherein said strip is curved in shape.

22. The apparatus of claim 21, wherein as said strip is extended the powder density is reduced.

* * * * *